US 7,940,705 B2

(12) United States Patent
Shaffer et al.

(10) Patent No.: US 7,940,705 B2
(45) Date of Patent: *May 10, 2011

(54) METHOD AND SYSTEM FOR BLOCKING COMMUNICATION WITHIN A CONFERENCE SERVICE

(75) Inventors: Shmuel Shaffer, Palo Alto, CA (US); Cullen F. Jennings, San Jose, CA (US); Labhesh Patel, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 1990 days.

This patent is subject to a terminal disclaimer.

(21) Appl. No.: 10/937,816

(22) Filed: Sep. 9, 2004

(65) Prior Publication Data

US 2006/0050658 A1 Mar. 9, 2006

(51) Int. Cl.
*H04L 12/16* (2006.01)
(52) U.S. Cl. ...... 370/261; 370/260; 370/352; 379/88.13; 379/202.01; 379/215.01; 709/204; 709/228
(58) Field of Classification Search .......... 379/202.01–207.01, 93.21, 158, 379/88.13, 215.01; 370/260–269, 352, 468, 370/202.01; 348/14.01, 14.08, 14.09; 455/426.1, 455/509; 709/204, 231, 217, 208; 434/350
See application file for complete search history.

(56) References Cited

U.S. PATENT DOCUMENTS

| 5,539,741 | A | | 7/1996 | Barraclough et al. ......... 370/62 |
|---|---|---|---|---|
| 5,963,246 | A | | 10/1999 | Kato ........................... 348/15 |
| 5,991,293 | A | * | 11/1999 | Buchanan et al. ........... 370/353 |
| 5,995,827 | A | * | 11/1999 | Gitlin et al. ................. 455/416 |
| 6,122,259 | A | | 9/2000 | Ishida ......................... 370/260 |
| 6,148,068 | A | * | 11/2000 | Lowery et al. ........... 379/202.01 |
| 6,178,237 | B1 | * | 1/2001 | Horn ....................... 379/202.01 |
| 6,215,880 | B1 | | 4/2001 | Hasegawa ..................... 381/66 |
| 6,317,776 | B1 | * | 11/2001 | Broussard et al. ........... 709/204 |
| 6,349,136 | B1 | * | 2/2002 | Light et al. .............. 379/202.01 |
| 6,453,022 | B1 | * | 9/2002 | Weinman, Jr. ............. 379/88.13 |
| 6,501,739 | B1 | * | 12/2002 | Cohen ......................... 370/260 |
| 6,502,126 | B1 | | 12/2002 | Pendakur .................... 709/204 |
| 6,522,739 | B1 | | 2/2003 | Kwon et al. ............. 379/202.01 |
| 6,535,238 | B1 | * | 3/2003 | Kressin ...................... 348/14.01 |
| 6,556,670 | B1 | * | 4/2003 | Horn ....................... 379/202.01 |
| 6,563,916 | B1 | * | 5/2003 | Deutsch et al. .......... 379/215.01 |
| 6,628,767 | B1 | * | 9/2003 | Wellner et al. .......... 379/202.01 |
| 6,697,614 | B2 | * | 2/2004 | Dorenbosch ................. 455/416 |
| 6,760,750 | B1 | * | 7/2004 | Boneh et al. ................. 709/204 |
| 6,990,497 | B2 | * | 1/2006 | O'Rourke et al. ................ 1/1 |
| 7,003,292 | B2 | * | 2/2006 | Toyryla ...................... 455/426.1 |
| 7,139,249 | B2 | * | 11/2006 | Norris et al. ................. 370/261 |
| 7,185,098 | B2 | * | 2/2007 | Wang et al. ................... 709/228 |
| 7,266,188 | B2 | * | 9/2007 | Carlson ................... 379/202.01 |
| 7,317,791 | B2 | * | 1/2008 | Carlson ................... 379/202.01 |
| 7,474,634 | B1 | * | 1/2009 | Webster et al. ............... 370/261 |
| 7,477,282 | B2 | * | 1/2009 | Firestone et al. .......... 348/14.09 |
| 7,492,729 | B2 | * | 2/2009 | Shaffer et al. ................. 370/260 |
| 7,546,376 | B2 | * | 6/2009 | Widegren et al. ............. 709/232 |

(Continued)

*Primary Examiner* — Gerald Gauthier
(74) *Attorney, Agent, or Firm* — Baker Botts L.L.P.

(57) ABSTRACT

A method for providing a conference service includes hosting a conference between a plurality of endpoints and communicating at least one media stream received from at least one of the plurality of endpoints to the remaining plurality of endpoints. The method also includes receiving a request to block communication of the at least one media stream to a first endpoint of the plurality of endpoints and blocking communication of the at least one media stream to the first endpoint.

32 Claims, 1 Drawing Sheet

U.S. PATENT DOCUMENTS

| | | | |
|---|---|---|---|
| 2002/0033880 A1* | 3/2002 | Sul et al. | 348/14.09 |
| 2002/0065928 A1* | 5/2002 | Senga et al. | 709/231 |
| 2002/0071540 A1* | 6/2002 | Dworkin | 379/202.01 |
| 2002/0119795 A1* | 8/2002 | Dorenbosch | 455/509 |
| 2002/0161910 A1* | 10/2002 | Bill et al. | 709/231 |
| 2002/0191550 A1* | 12/2002 | Wilson | 370/260 |
| 2003/0112947 A1* | 6/2003 | Cohen | 379/202.01 |
| 2004/0002049 A1* | 1/2004 | Beavers et al. | 434/350 |
| 2004/0039794 A1* | 2/2004 | Biby et al. | 709/217 |
| 2004/0068597 A1* | 4/2004 | Kulick et al. | 710/240 |
| 2004/0119814 A1* | 6/2004 | Clisham et al. | 348/14.08 |
| 2004/0267882 A1* | 12/2004 | Whynot et al. | 709/204 |
| 2005/0198385 A1* | 9/2005 | Aust et al. | 709/245 |
| 2005/0278424 A1* | 12/2005 | White | 709/204 |
| 2008/0049723 A1* | 2/2008 | Bill et al. | 370/352 |

* cited by examiner

METHOD AND SYSTEM FOR BLOCKING COMMUNICATION WITHIN A CONFERENCE SERVICE

TECHNICAL FIELD OF THE INVENTION

The present invention relates generally to communication systems and, more particularly, to a method and system for providing a conference service.

BACKGROUND OF THE INVENTION

Historically, telecommunications have involved the transmission of voice and fax signals over a network dedicated to telecommunications, such as the Public Switch Telephone Network (PSTN). Similarly, data communications between computers have been historically transmitted on a dedicated data network, such a Local Area Network (LAN) or a Wide Area Network (WAN). Currently telecommunications and data transmissions are being merged into a integrated communication network using technology such as Voiceover Internet Protocol (VoIP). Since many LANs and WANs transmit computer data using Intranet Protocol (IP), VoIP uses this existing technology to transmit voice and fax signals by converting these signals into digital data and encapsulating the data for transmission over an IP network.

Traditional communication networks often support multipoint conferences between a number of participants using different communication devices. A multipoint conference unit (MCU) is used to couple these devices, which allows users from distributed geographic locations to participate in the conference. The conference may be audio only (e.g. teleconference) or may include video conferencing/broadcasting. In typical multipoint conference systems, communications from the participants are transmitted to each of the other participants in the conference.

One example application of a multipoint conference system involves the use of an interactive voice response (IVR) system at a call center and a live agent participating on a conference with a caller. IVR systems are programmed to allow direct interaction between callers and the IVR system, thus reducing the need for assigning a separate agent to handle an incoming call. The communication from the caller to the IVR system may be through dual tone multiple frequency (DTMF) signals or through speech. For example, the IVR system may include automatic speech recognition (ASR) capability to automatically recognize spoken words of the caller. Many IVR system scripts provide an option to transfer to a live agent for callers who cannot successfully navigate through the script. In some scenarios, the agent handles the incoming call by interacting directly with the caller. In other scenarios, the agent conferences in the caller and the IVR system via a three-way conference (e.g., a conference bridge) and guides the caller through the IVR options. This provides an opportunity to teach the caller about the use of the IVR system and thus reduces the need for future agent interaction.

In some call centers, a supervisor may be able to establish a "whisper" session with a live agent who is on a call with a caller. In this case, the supervisor may monitor the audio stream between the caller and the agent and may create an audio session with the agent to give the agent feedback and/or directions.

SUMMARY OF THE INVENTION

The present invention provides a method and system for providing a conference service that substantially eliminates or reduces at least some of the disadvantages and problems associated with previous methods and systems.

In accordance with a particular embodiment, a method for providing a conference service includes hosting a conference between a plurality of endpoints and communicating at least one media stream received from at least one of the plurality of endpoints to the remaining plurality of endpoints. The method also includes receiving a request to block communication of the at least one media stream to a first endpoint of the plurality of endpoints and blocking communication of the at least one media stream to the first endpoint.

The first endpoint may comprise an interactive voice response (IVR) system, a second endpoint of the plurality of endpoints may be used by an agent and a third endpoint of the plurality of endpoints may be used by a caller. Receiving a request to block communication of the at least one media stream to the first endpoint may comprise receiving a request from the agent to block communication of the at least one media stream to the IVR system.

In another embodiment, the first endpoint may be used by an agent, a second endpoint of the plurality of endpoints may be used by a caller and a third endpoint of the plurality of endpoints may comprise an IVR system. Receiving a request to block communication of the at least one media stream to the first endpoint may comprise receiving a request from the caller to block communication of the at least one media stream to the agent. The blocked at least one media stream may comprise confidential information of the caller. Receiving a request to block communication of the at least one media stream to a first endpoint may comprise receiving a request through a dual tone multi frequency (DTMF) signal, speech, the web or instant messaging (IM) to block communication of the at least one media stream to the first endpoint.

In accordance with another embodiment, a system for providing a conference service includes a conference unit operable to host a conference between a plurality of endpoints. The conference unit is operable to communicate at least one media stream received from at least one of the plurality of endpoints to the remaining plurality of endpoints and to receive a request to block communication of the at least one media stream to a first endpoint of the plurality of endpoints. The conference unit comprises at least one control module operable to block communication of the at least one media stream to the first endpoint.

Technical advantages of particular embodiments include a multipoint conference unit that is able to block communication of conference media streams to selective endpoints. Thus, conference participants such as callers or agents may be able to control the participants that receive certain conference media streams. This may enable agents to train callers on how to use IVR systems with automatic speech recognition capability without triggering and confusing the IVR system. Moreover, callers may be able to prevent an agent from hearing confidential information of the caller when the caller must audibly transmit such information to an IVR system conferenced in with the caller and the agent. Thus, the caller's confidential information may not be sacrificed by communication to an agent.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
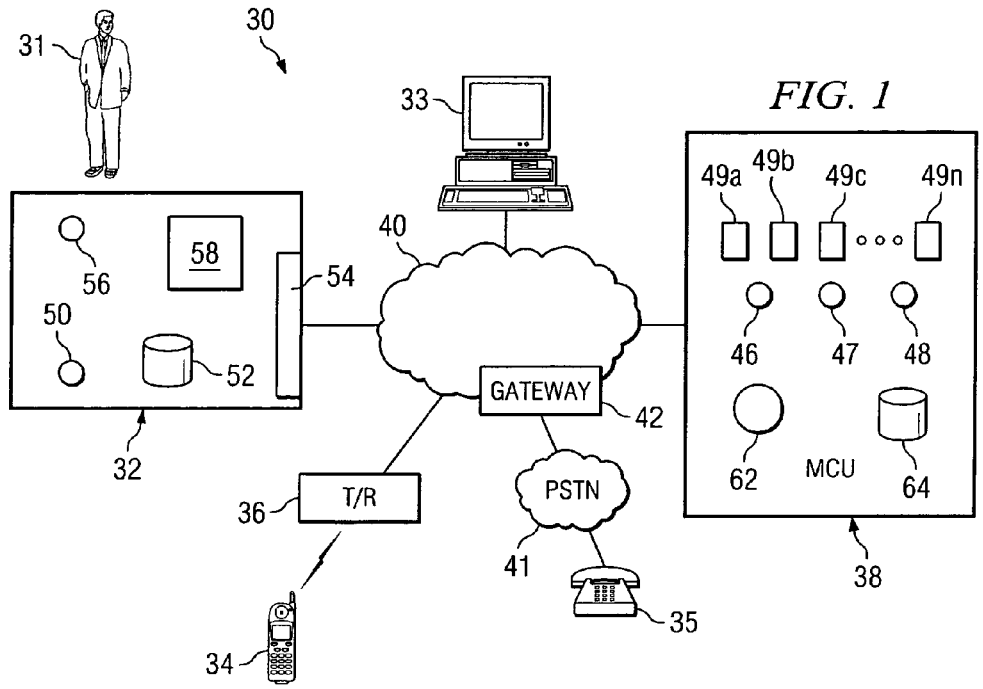
FIG. 1 illustrates a communication system with a plurality of endpoints and a multipoint conference unit, in accordance with a particular embodiment of the present invention.

FIG. 1 illustrates a communication system 30 including a plurality of endpoints 32-35 having the ability to establish communication sessions with each other and/or a multipoint conference unit (MCU) 38. Such communication sessions may be established using communication networks 40, 41 and/or additional endpoints, components or resources coupled with communication networks 40 or 41. MCU 38 hosts, or accommodates, multipoint conferences between and among endpoints 32-35. An MCU or other entity may be considered to be hosting a conference if it is one or more of the components that accommodates or otherwise provides conference resources to facilitate the conference. MCU 38 includes a plurality of digital signal processors (DSPs) 46-48 and a plurality of communication ports 49a-49n. In particular embodiments, MCU 38 may include software functioning as a DSP on a general purpose central processing unit.

In accordance with particular embodiments, systems and methods are provided that allow a multipoint conference participant to control the output of a media stream from that participant to other conference participants. For example, in an audio conference among three conference participants A, B and C, conference participant A may prevent conference participant C from receiving (e.g., hearing) audio conference output from other participants. In this case, conference participant B may still receive output from participants A and C, and conference participant A may still receive output from participants B and C. Thus, particular embodiments allow one or more conference participants to control the ability of a participant to receive output from the conference. The blocking of media streams to or from an endpoint may include blocking voice or video streams, including, for example, files. In particular embodiments, the control modules may block a control channel or signaling received from one endpoint from being communicated to one or more other endpoints. Such control channel or signaling may be used by a participant, for example, for call setup purposes or for transmitting information to an IVR system, such as transmitting account information through DTMF signaling.

Endpoints 32-35 may be any combination of hardware, software and/or encoded logic that provide communication services to a user. For example, endpoints 32-35 may include a telephone, a mobile phone, a computer running telephony software, a video monitor, a camera or any other communication hardware, software and/or encoded logic that supports the communication of media using communication network 40. In the illustrated embodiment, endpoints 32-34 include an internet telephone, a personal computer and wireless handset, respectively. A wireless base station transmitter/receiver 36 couples endpoint 34 with communication network 40. Endpoints 32-35 may also include unattended or automated systems, gateways, other intermediate components or other devices that can establish media sessions. Although FIG. 1 illustrates four endpoints 32-35, communication system 30 contemplates any number and arrangement of endpoints 32-35 for communicating media. For example, the described technologies and techniques for establishing a communication session between or among endpoints 32-35 may be operable to establish a multipoint conference between more than two endpoints 32-35.

In the illustrated embodiment, endpoint 32 includes a processor 50, memory 52 a network interface 54 and a codec 56. Endpoint 32 also includes a user interface 58, which may include a microphone, video camera, speaker, keyboard, video display, LCD display and/or other device. In accordance with another embodiment, user interface 58 may be coupled with components that include a microphone, video camera, speaker, keyboard, video display and/or other device, rather than incorporating such components into endpoint 32. Participant 31 participates on a conference hosted by MCU 38 using endpoint 32. Endpoints 33-35 include similar or identical components to endpoint 32, having similar functionality.

In the illustrated embodiment, MCU 38 acts as an intermediary during the multipoint communication conference, collects all audio and/or video streams transmitted by the participants through their endpoints and distributes such streams to the participants of the multipoint conference at their endpoints. Typically, for Internet Protocol (IP) telephony applications, conferences are hosted by a MCU.

MCU 38 may include any bridging or switching device used in support of multipoint conferencing, including videoconferencing. MCU 38 mixes the input media streams for conveyance at an output stream to one or more endpoints coupled to the MCU. In various embodiments, MCU 38 may include hardware, software and/or embedded logic. MCU 38 may be configured to support any number of conference endpoints communicating on any number of conferences, simultaneously. MCU 38 may be in the form of customer provided equipment (CPE) (for example, beyond the network interface) or may be embedded in a wide area network (WAN). Examples of multipoint conference unit standards are defined in ITU-T H.323, with T.120 describing generic conference control functions.

In the illustrated embodiment, MCU 38 includes a processor 62 and memory 64. Processor 62 may be a microprocessor, controller or any other suitable computing device or resource. Memory 64 may be any form of volatile or nonvolatile memory including, without limitation, magnetic media, optical media, random access memory (RAM), read only memory (ROM), removable media or any other suitable local or remote memory component. A user of communication system 30 may configure MCU 38 to accommodate a future multipoint conference, using processor 62 and memory 64. When a user or network administrator schedules or otherwise establishes a multipoint conference, MCU 38 prompts the administrator to identify the number of participants and one or more unique identifiers. The MCU may use, for example, a separate unique identifier for each participant of a conference or a single unique identifier for the entire conference (one for all the conference participants). In some cases, MCU 38 may include additional components, such as switches, servers, controllers or other modules, to aid in providing the functionality described above to allow conference participants to control their own or others' output to other conference participants, and currently illustrated components such as DSPs 46-48 and processor 62 may also aid in providing this functionality.

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32-35 for communication. In the illustrated embodiment, communication network 40 is a wide area network (WAN) that enables communication between a plurality of endpoints distributed across multiple cities and geographic regions, and communication network 41 is a public switched telephone network (PSTN). However, communication networks 40 and/or 41 may be one or more networks, including the Internet, the public switched telephone network, local area networks (LANs), global distributed networks such as intranets, extranets or other form of wireless or wireline communication networks. Generally, communication networks 40 and 41 provide for the communication of packets, cells, frames and/or other portions of information (generally referred to as packets) between and among endpoints 32-35. Communication paths for the communication of such packets may include any combination of routers, hubs, switches, gateways (e.g., gateway 42) or other hardware, software or embedded logic implementing any number of communication protocols that allow for the exchange of packets in communication system 30.

In a particular embodiment, communication network 40 employs communication protocols that allow for the addressing or identification of endpoints 32-35 coupled to communication network 40. For example, using Internet protocol (IP), each of the components coupled together by communication network 40 in communication system 30 may be identified in information directed using IP addresses. In this manner, communication network 40 may support any form and combination of point-to-point, multicast, unicast or other techniques for exchanging media packets among components in communication system 30.

Any given communication session between two of endpoints 32-35 will include the transfer of packets across one or more communication paths, that couple endpoints 32-35 and/or MCU 38 across communication network 40. Such paths may include any combination of network components, gatekeepers, call managers, routers, hubs, switches, gateways, endpoints or other hardware, software or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks through the use of gateway 42. For example, network 40 is coupled to Public Switched Telephone Network (PSTN) 41. PSTN 41 includes switching stations, central offices, mobile telephone switching offices, pager switching offices, remote terminals and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over IP (VoIP). In the illustrated embodiment, endpoints 32-34 and MCU 38 are IP telephony devices. IP telephony devices have the capability of encapsulating a user's voice (or other inputs) into IP packets so that the voice can be transmitted over network 40. Similarly, IP telephony devices 32-34 have the capability of capturing and encapsulating video into IP packets so that the video can be transmitted over network 40. Conversely, IP telephony devices 32-34 have the capability of receiving audio or video IP packets from the network 40 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 42 may accomplish several functions, such as converting analog or digital circuit-switched data transmitted by PSTN 41 to packetized data transmitted by network 40 and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VoIP call control system and other signaling protocols (e.g., SS7, T1, ISDN, etc.) used in PSTN 41 and translates and/or maps between the IP network addresses and PSTN phone numbers.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

Figure 2:
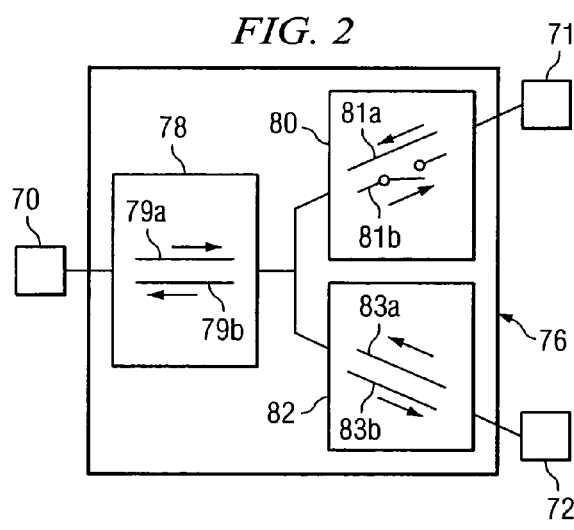
FIG. 2 illustrates the multipoint conference unit of FIG. 1 with a plurality of endpoints, in accordance with a particular embodiment of the present invention.

FIG. 2 illustrates a plurality of endpoints 70-72 coupled to an MCU 76, in accordance with a particular embodiment. MCU 76 provides conference functionality between participants using endpoints 70-72. Endpoints 70-72 may be similar to one or more of endpoints 32-35 described above with respect to FIG. 1. It should be understood that endpoints 70-72 may be coupled to MCU 76 through one or more communication networks, such as communication networks 40 and 41 described above with respect to FIG. 1 which may include one or more WANs or LANs as indicated above.

MCU 76 may be similar to MCU 38 described above with respect to FIG. 1. In this embodiment, MCU 76 includes specifically illustrated control modules 78, 80 and 82 to aid in providing conference participants at endpoints 70-72 the ability to control output to other participants as described below.

Control module 78 includes an input stream 79a that communicates media from endpoint 70 to the conference and an output stream 79b that communicates media from other conference endpoints to endpoint 70. Control module 80 includes an input stream 81a that communicates media from endpoint 71 to the conference and an output stream 81b that communicates media from other conference endpoints to endpoint 71. Control module 82 includes an input stream 83a that communicates media from endpoint 72 to the conference and an output stream 83b that communicates media from other conference endpoints to endpoint 72. Each control module 78, 80 and 82 is able to prevent communication through the module of either communication stream passing through the module. Such functionality to prevent the passing of one or more communication streams may be implemented through one or more switches or other suitable components or logic, such as IP packet discrimination logic based on source and target IP addresses. In particular embodiments, participants at any endpoint may have the ability to control any control module, while in other embodiments participants at some endpoints may only have the ability to control particular control modules. In some embodiments, control modules may be controlled by a non-participant, such as an administrator or operator of MCU 76.

As an example in operation, MCU 76 may host a conference between respective participants at endpoints 70-72. In normal operation, communication from each participant is transmitted to each of the other participants. However, if, for example, the participant at endpoint 70 desires for its communication to be transmitted to the participant at endpoint 72 but not to the participant at endpoint 71, then control module 80 may prevent the communication of output stream 81b to endpoint 71. If a participant at endpoint 72 then desires for its communication output to be transmitted to all participants, control module 80 may allow output stream 81b to be communicated to endpoint 71. Control of the control modules may be implemented using DTMF signals, speech, web, instant messaging (IM) or any other suitable communication method. This provides participants great flexibility in their ability to control communication streams to various endpoints of the conference. As indicated above, particular embodiments may allow for the control or blocking of signaling received from one or more conference participants from being communicated to other participants. For example, the control modules may disable the in-band DTMF signals from one or more endpoints and thus provide better security for the caller.

The ability to control the communication of media and signaling to other conference participants may be implemented in conferences having any number of participants. In particular circumstances, it may be desirable for only certain participants to have this communication control. For example, according to particular circumstances or a particular system, a participant at endpoint 70 may only have the ability to prevent communication of his output to endpoint 71 (through control of control module 80), while the participant at endpoint 70 has no ability to control control module 82 to prevent communication of his output to endpoint 72. In addition, some endpoints may not have an associated control module such that communication to and/or from that endpoint may not be blocked or otherwise prevented. Various embodiments contemplate a multitude of implementation variations by limiting the number of endpoints with any conference communication output control and limiting the endpoints that can be controlled by such number of endpoints.

In particular embodiments, a participant at endpoint 70 may desire to block his media stream to a participant at endpoint 72, while, at the same time, a participant at endpoint 71 still wants the participant at endpoint 72 to hear his voice stream. In this example, control module 82 may block packets from endpoint 70 to endpoint 72 while passing to endpoint 72 packets from endpoint 71. This discrimination between the packets may, for example, be implemented based on the source and target IP addresses.

It should be understood that the use of control modules 78-80 to illustrate the control of media and signaling to and from conference participants is for illustration purposes only, and the ability to allow participants to control multipoint conference media may be implemented using any suitable type of communication hardware, software and/or encoded logic.

As an additional implementation example, assume that a caller calls into a retailer, such as a department store. Participant 70 calls the department store and is placed into communication with an IVR system with ASR capability. Rather than finding the correct option with the IVR system to transfer to a particular department (e.g., the toy department) or extension, the caller requests to be transferred to a live agent. The agent may conference in the IVR system. For purposes of this example, assume that the caller calling into the department store is using endpoint 70, the live agent is using endpoint 72, endpoint 71 comprises the IVR system with ASR capability and MCU 76 hosts the multipoint conference between the caller, the live agent and the IVR system.

If the agent attempts to talk the caller through the menu under normal conference operation (for example, with no control modules 78, 80 and 82), the ASR capability of the IVR may mistaken the spoken words of the agent as navigation input from the caller. Thus, as a result of implementation of ASR capability with the IVR system, the agent may not be able to effectively talk with the caller and guide the caller through the IVR scripts, because the agent's audio instructions (e.g., the agent's voice) would be heard by the IVR system and mistaken for input. To alleviate this concern, the agent can control control module 80 such that endpoint 71 (the IVR system) does not receive output stream 81b from the conference. For example, the agent may issues a command to MCU 76 to disable through control module 80 the media stream to endpoint 71 (the IVR system). This can be done by pressing, for example, "*3" on the DTMF keys of the agent's endpoint 72, issuing a command from a web controlled browser, using a spoken command "start training," or any other suitable communication method. Upon receiving this command, MCU 76 disables the output to endpoint 71. The IVR system may announce the options "For the toy department say 'toys' or press 7; if you want to hear this menu again press 9." The agent explains to the caller that upon hearing this prompt next time he should speak the word "toys." During this explanation, the IVR system is heard, but the ASR capability of the IVR system cannot hear the dialog between the agent and the caller. At the end of the explanation session, the agent may tell the caller, "Let me now enable the IVR system for you." The agent may, for example, press "*4", followed by "9" which prompts the IVR system to recite all of the menu options. The caller says "toys" and is transferred to the desired destination.

As another example, a caller may call into a bank to receive account information, such as account balance. In normal multipoint conference operation (without control modules to control communication streams to and from endpoints), an IVR system with ASR capability may answer the call and offer a self-service session. The caller may have difficulty in correctly following instructions given by the IVR system and may thus request a transfer to a live agent. A live agent may conference in the IVR system and guide the caller through the IVR script. At some point the caller may be prompted by the IVR system or the agent to speak confidential information of the caller (e.g., account number, password, PIN, etc.) for recognition by the ASR capability of the IVR system. If all communication streams are transmitted to each participant in the conference, then the agent may hear the caller's confidential information.

However, if the caller has the ability to control the output communication stream to the agent using functionality described herein, then the caller can communicate the caller's confidential information to the IVR system while preventing the agent from being able to hear such confidential information. For example, assume the caller is at endpoint 70, the IVR system is endpoint 71 and the agent is at endpoint 72. When the caller desires to communicate confidential information to the IVR system (endpoint 71), the caller may control control module 82 to prevent the communication of output stream 83b to endpoint 72 during this confidential information communication. For example, the caller may be instructed by the agent to enter a control string (e.g., "5") in order to mute the media output to the agent. Upon hearing the request for confidential information from the IVR system, the caller may enter "5" and may hear the prompt "This is a secure session; you may hear the agent but he cannot hear your interaction with the system. You may now convey your confidential information." The caller may speak and convey the caller's password. In response, the IVR system may, for example, provide the caller with an account balance. When no more confidential information will be communicated, the caller may enter, for example, "6" to enable the media stream to the agent. Upon entering this string, the caller may hear the prompt "Exiting secure session; the agent can hear you now." Thus, enabling a caller to control output of the media stream to the agent allows a caller to include the agent in a session with an IVR system when the caller needs help, while allowing the caller to convey and receive confidential information to and from the IVR system. In other cases, the agent at endpoint 72 may control control module 82 to prevent output stream 82b communications to endpoint 72 for a period of time during which confidential information may be communicated from the caller at endpoint 70**. As indicated above, control of media streams (e.g., by controlling control modules) may be implemented using DTMF signals, speech, web, IM or any other suitable communication method.

In particular embodiments, an IVR system such as endpoint 71 in the example above, may control control modules to block communication between, for example, the agent and the caller (e.g., when the caller will be communicating confidential information to the IVR system as described above). This may be implemented automatically, for example through a script, in particular embodiments.

It should be understood that particular embodiments provide for any number of conference participants to have the ability to control any number of communication streams during a conference. In addition, as indicated above, some participants may only be able to control or block particular communication streams according to particular implementations, and some participants may not be able to control or block any communication streams. At any point in the conference one or more participants may be able to query an MCU, using DTMF signals, speech, web, instant messaging (IM) or any other suitable communication method, to determine the communication streams being blocked and the participants to and/or from which such streams are being blocked.

Figure 3:
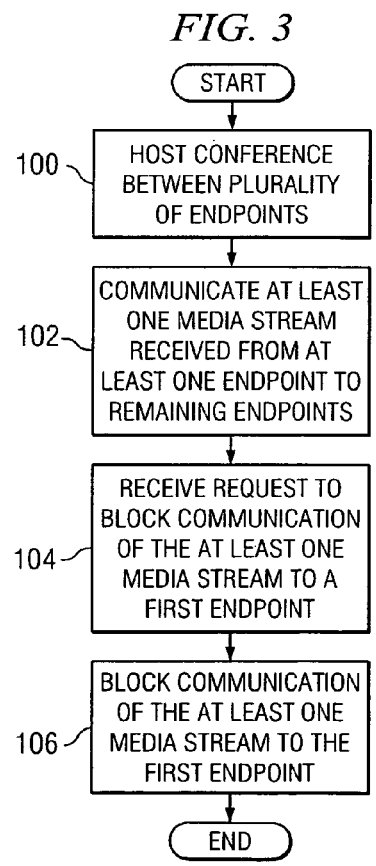
FIG. 3 illustrates a method for providing a conference service, in accordance with an embodiment of the present invention.

FIG. 3 is a flowchart illustrating a method for providing a conference service, in accordance with a particular embodiment. The method begins at step 100 where a conference is hosted between a plurality of endpoints. The conference may be hosted by an MCU coupled with the plurality of endpoints, and at least some of the endpoints may be used by various participants such as callers and agents. At step 102, at least one media stream received from at least one endpoint is communicated to the remaining endpoints. This step may be implemented through a conference bridge of the MCU. The at least one media stream may be one of a plurality of media streams from various endpoints that are communicated to the other endpoints.

At step 104, a request is received to block communication of the at least one media stream to a first endpoint. Thus, the first endpoint will not receive the at least one media stream that may include communications from any of a number of endpoints. The request to block communication of the at least one media stream to a first endpoint may be received through speech, a web request, DTMF signal, IM or any other suitable method. The first endpoint may comprise an IVR system or may be another type of endpoint used by a particular type of participant, such as a caller or an agent. At step 106, communication of the at least one media stream is blocked to the first endpoint. Such blocking may be implemented, for example, through a switch or control module of the MCU.

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and MCUs 38 and 76, these elements may be combined, rearranged or positioned in order to accommodate particular routing architectures or needs. In addition, any of these elements may be provided as separate external components to communication system 30 or MCUs 38 and/or 76 where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A computer-implemented method for providing a conference service executable on a processor, comprising:

hosting a conference between a plurality of endpoints;

communicating at least one media stream received from at least one of the plurality of endpoints to the remaining plurality of endpoints;

receiving a request to block communication of the at least one media stream to a first endpoint of the plurality of endpoints;

blocking communication of the at least one media stream to the first endpoint; and wherein the first endpoint comprises an interactive voice response (IVR) system;

a second endpoint of the plurality of endpoints is used by an agent;

a third endpoint of the plurality of endpoints is used by a caller; and receiving a request to block communication of the at least one media stream to the first endpoint comprises receiving a request from the agent to block communication of the at least one media stream to the IVR system.

2. The method of claim 1, further comprising receiving a request from the caller to block communication to the agent of a media steam of the caller.

3. The method of claim 2, wherein the blocked at least one media stream comprises confidential information of the caller.

4. The method of claim 1, further comprising receiving a request from the IVR system to block communication to an endpoint of a media stream of the IVR, the request transmitted from the IVR system as a result of a script.

5. The method of claim 1, wherein receiving a request to block communication of the at least one media stream to a first endpoint comprises receiving a request through a dual tone multi frequency (DTMF) signal to block communication of the at least one media stream to the first endpoint.

6. The method of claim 1, wherein receiving a request to block communication of the at least one media stream to a first endpoint comprises receiving a request through speech to block communication of the at least one media stream to the first endpoint.

7. The method of claim 1, wherein receiving a request to block communication of the at least one media stream to a first endpoint comprises receiving a web request to block communication of the at least one media stream to the first endpoint.

8. The method of claim 1, wherein receiving a request to block communication of the at least one media stream to a first endpoint comprises receiving a request through instant messaging (IM) to block communication of the at least one media stream to the first endpoint.

9. A system for providing a conference service, comprising:
a conference unit operable to host a conference between a plurality of endpoints;
the conference unit operable to communicate at least one media stream received from at least one of the plurality of endpoints to the remaining plurality of endpoints;
the conference unit operable to receive a request to block communication of the at least one media stream to a first endpoint of the plurality of endpoints;
the conference unit comprising at least one control module operable to block communication of the at least one media stream to the first endpoint; and
wherein:
the first endpoint comprises an interactive voice response (IVR) system;
a second endpoint of the plurality of endpoints is used by an agent;
a third endpoint of the plurality of endpoints is used by a caller; and
the conference unit operable to receive a request to block communication of the at least one media stream to a first endpoint comprises the conference unit operable to receive a request from the agent to block communication of the at least one media stream to the IVR system.

10. The system of claim 9, wherein the conference unit is operable to receive a request from the caller to block communication of the at least one media stream to the agent.

11. The system of claim 10, wherein the blocked at least one media stream comprises confidential information of the caller.

12. The system of claim 9, wherein the conference unit is operable to receive a request from the IVR system to block communication of the at least one media stream to a first endpoint, the request transmitted from the IVR system as a result of a script.

13. The system of claim 9, wherein the conference unit operable to receive a request to block communication of the at least one media stream to a first endpoint comprises the conference unit operable to receive a request through a dual tone multi frequency (DTMF) signal to block communication of the at least one media stream to the first endpoint.

14. The system of claim 9, wherein the conference unit operable to receive a request to block communication of the at least one media stream to a first endpoint comprises the conference unit operable to receive a request through speech to block communication of the at least one media stream to the first endpoint.

15. The system of claim 9, wherein the conference unit operable to receive a request to block communication of the at least one media stream to a first endpoint comprises the conference unit operable to receive a web request to block communication of the at least one media stream to the first endpoint.

16. The system of claim 9, wherein the conference unit operable to receive a request to block communication of the at least one media stream to a first endpoint comprises the conference unit operable to receive a request through instant messaging (IM) to block communication of the at least one media stream to the first endpoint.

17. A system for providing a conference service, comprising:
means for hosting a conference between a plurality of endpoints;
means for communicating at least one media stream received from at least one of the plurality of endpoints to the remaining plurality of endpoints;
means for receiving a request to block communication of the at least one media stream to a first endpoint of the plurality of endpoints;
means for blocking communication of the at least one media stream to the first endpoint; and
wherein:
the first endpoint comprises an interactive voice response (IVR) system;
a second endpoint of the plurality of endpoints is used by an agent;
a third endpoint of the plurality of endpoints is used by a caller; and
means for receiving a request to block communication of the at least one media stream to the first endpoint comprises means for receiving a request from the agent to block communication of the at least one media stream to the IVR system.

18. The system of claim 17, further comprising means for receiving a request from the caller to block communication of the at least one media stream to the agent.

19. The system of claim 18, wherein the blocked at least one media stream comprises confidential information of the caller.

20. The system of claim 17, further comprising means for receiving a request from the IVR system to block communication of the at least one media stream to a first endpoint, the request transmitted from the IVR system as a result of a script.

21. The system of claim 17, wherein means for receiving a request to block communication of the at least one media stream to a first endpoint comprises means for receiving a request through a dual tone multi frequency (DTMF) signal to block communication of the at least one media stream to the first endpoint.

22. The system of claim 17, wherein means for receiving a request to block communication of the at least one media stream to a first endpoint comprises means for receiving a request through speech to block communication of the at least one media stream to the first endpoint.

23. The system of claim 17, wherein means for receiving a request to block communication of the at least one media stream to a first endpoint comprises means for receiving a web request to block communication of the at means for least one media stream to the first endpoint.

24. The system of claim 17, wherein means for receiving a request to block communication of the at least one media stream to a first endpoint comprises means for receiving a request through instant messaging (IM) to block communication of the at least one media stream to the first endpoint.

25. Software embodied in a computer readable medium, the computer readable medium comprising code operable to:
host a conference between a plurality of endpoints;
communicate at least one media stream received from at least one of the plurality of endpoints to the remaining plurality of endpoints;
receive a request to block communication of the at least one media stream to a first endpoint of the plurality of endpoints;
block communication of the at least one media stream to the first endpoint; and
wherein:
the first endpoint comprises an interactive voice response (IVR) system;
a second endpoint of the plurality of endpoints is used by an agent;
a third endpoint of the plurality of endpoints is used by a caller; and
code operable to receive a request to block communication of the at least one media stream to the first endpoint comprises receiving a request from the agent to block communication of the at least one media stream to the IVR system.

26. The medium of claim 25, further comprising code operable to receive a request from the caller to block communication of the at least one media stream to the agent.

27. The medium of claim 26, wherein the blocked at least one media stream comprises confidential information of the caller.

28. The medium of claim 25, further comprising code operable to receive a request from the IVR system to block communication of the at least one media stream to a first endpoint, the request transmitted from the IVR system as a result of a script.

29. The medium of claim 25, wherein code operable to receive a request to block communication of the at least one media stream to a first endpoint comprises code operable to receive a request through a dual tone multi frequency (DTMF) signal to block communication of the at least one media stream to the first endpoint.

30. The medium of claim 25, wherein code operable to receive a request to block communication of the at least one media stream to a first endpoint comprises code operable to receive a request through speech to block communication of the at least one media stream to the first endpoint.

31. The medium of claim 25, wherein code operable to receive a request to block communication of the at least one media stream to a first endpoint comprises code operable to receive a web request to block communication of the at least one media stream to the first endpoint.

32. The medium of claim 25, wherein code operable to receive a request to block communication of the at least one media stream to a first endpoint comprises code operable to receive a request through instant messaging (IM) to block communication of the at least one media stream to the first endpoint.

* * * * *